R. R. SMITH.
SPRING HAMMER.
APPLICATION FILED OCT. 25, 1912.
1,075,950.
Patented Oct. 14, 1913.
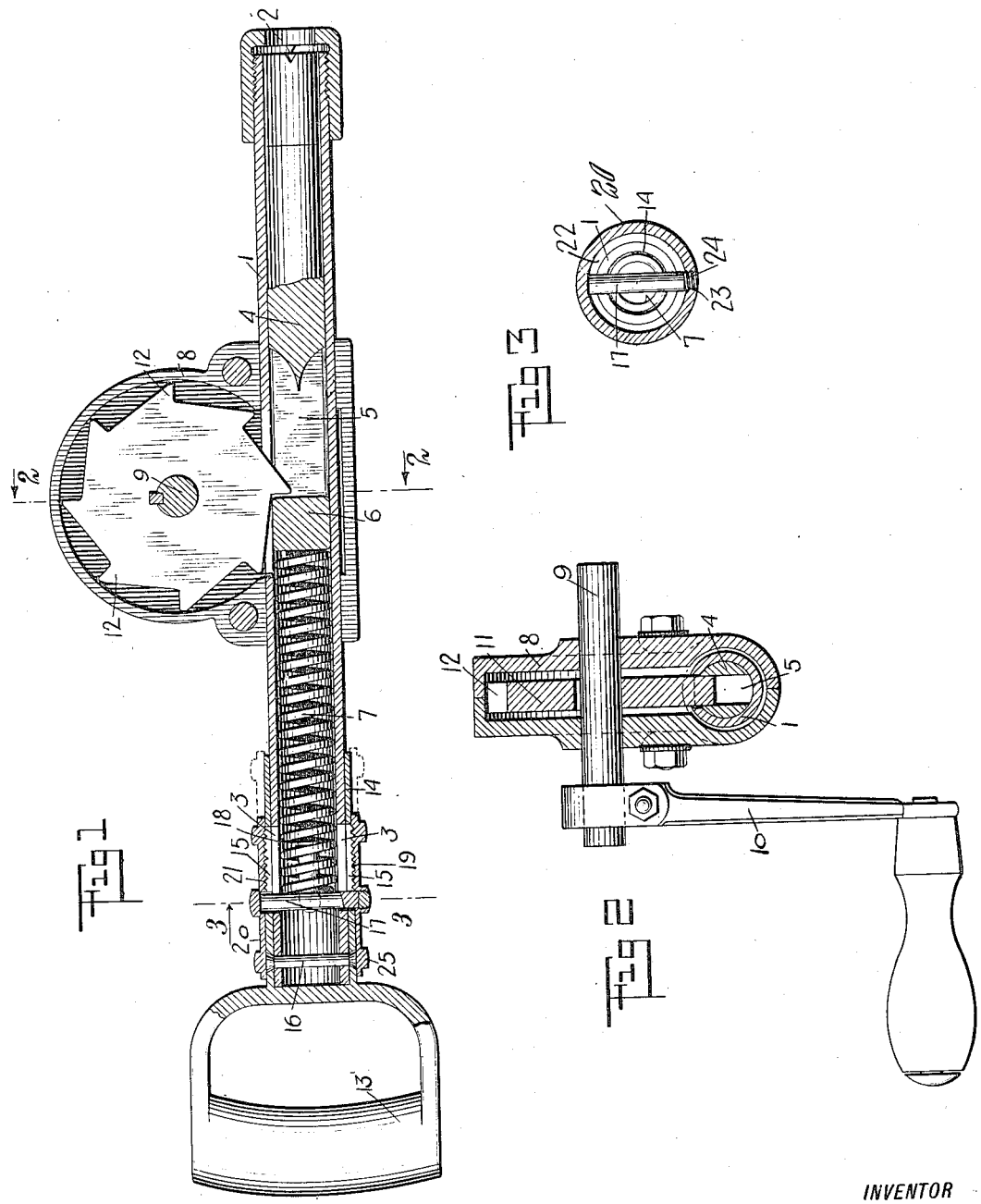
WITNESSES
INVENTOR
Rollyn R. Smith,
BY
ATTORNEYS

UNITED STATES PATENT OFFICE.

ROLLYN ROBERT SMITH, OF OKLAHOMA, OKLAHOMA, ASSIGNOR TO GEORGE Y. BIRD, OF PAWHUSKA, OKLAHOMA.

SPRING-HAMMER.

1,075,950.  Specification of Letters Patent.  Patented Oct. 14, 1913.

Application filed October 25, 1912. Serial No. 727,753.

*To all whom it may concern:*

Be it known that I, ROLLYN R. SMITH, a citizen of the United States, and a resident of Oklahoma city, in the county and State of Oklahoma, have invented a new and Improved Spring-Hammer, of which the following is a full, clear, and exact description.

This invention comprises new and useful improvements in spring hammers, such, for instance, as are described and claimed in Letters Patent No. 1,006,873.

The present invention is directed to an improved means of varying the pressure on the hammer element by compressing or relaxing the spring, the said means being carried on the outside of the casing, and the relation of the said means to the casing affording an indication of the pressure on the said spring.

Reference is to be had to the accompanying drawings forming a part of this specification, in which like characters of reference indicate corresponding parts in all the views, and in which—

Figure 1 is a vertical sectional view of the hammer; Fig. 2 is a sectional view on the line 2—2 of Fig. 1; while Fig. 3 is a sectional view on the line 3—3 of Fig. 1.

The hammer comprises the tubular casing 1 having the tool holder 2 at one end, the other end being open, the casing adjacent the said open end being provided with oppositely positioned and longitudinally extending slots 3. Within the casing is a movable element 4 constituting the hammer, which element is provided with a longitudinally extending recess 5 whereby an end portion 6 results, the helical spring 7 bearing against the inner end of the hammer. Fixed on the outside of the casing 1 is a housing 8 having a shaft 9 extending transversely thereof to which the handle 10 is secured, the intermediate portion of the shaft carrying a wheel 11 having a number of projections 12 thereon, which projections are adapted to successively engage the end portion 6 of the hammer when the handle is turned.

The open end of the casing 1 is closed by a handle 13 having a substantially tubular extension 14 thereon into which the said open end portion of the casing 1 extends, the extension being provided with longitudinally extending slots 15 which register with the slots 3 in the casing when the parts are assembled, as shown particularly in Figs. 1 and 3. The handle and the casing are held together in any suitable manner, preferably by means of a transversely extending pin 16 which engages the parts.

Extending transversely of the casing 1, and positioned in the said slots 3 and 15, is a pin 17 having a forwardly extending portion 18 thereon, the said pin engaging the end of the helical spring 7 with the said extension entering within the spring, the purpose being that as the pin is moved back and forth longitudinally of the casing the pressure of the said spring on the hammer 4 may be varied. In order to bring about variation in the pressure of this spring, and at the same time to afford an indicating mechanism, the following structure is preferably made use of: The outside of the extension 14 of the handle adjacent the said slots 3 is threaded as at 19 for a suitable distance, and arranged concentrically with the extension of the handle is a sleeve 20 having a threaded portion 21 in its interior engaging with the said threads 19, whereby the sleeve may be moved longitudinally of the casing and retained in any desired position. Extending around the inside of the sleeve, and substantially intermediate its ends, is a circular channel 22 into which the ends of the said transversely extending pin 17 are positioned, the said sleeve being provided with an opening 23 extending therethrough which communicates with the channel, whereby the pin may be entered into position, removal of the pin being prevented by means of a small screw 24 which effectively closes the said opening after the parts are assembled.

In order to provide for convenient turning of the sleeve 20 the outside is preferably ridged as at 25, which ridged portions are knurled, thereby affording a firm grip. As the handle 10 is turned the successive projections 12 on the wheel 11 come into engagement with the end 6 of the hammer and compress the spring 7, the end of the hammer slipping away from the said projections, whereby a series of blows is delivered to the tool held in the holder; the force of the blow delivered may be varied, by varying the pressure of the spring 7 on the end of the hammer, and this variation in pressure is effected by merely turning the sleeve 20 in one direction or the other so that the transversely extending pin 17, bearing against the end of the spring, brings it to the desired degree of compression. The inter-engagement of the threaded portions of the said sleeve and the outside of the extension of the handle prevents the return of the sleeve save through turning, the result being that separate locking means is not necessary. As the sleeve is moved along the extension 14, say to the broken line position of Fig. 1, the pressure of the spring on the hammer is a maximum; in such position of the parts the end of the sleeve lies at a maximum distance from the handle, and at all intermediate pressures the said end of the sleeve lies at varying distances from the handle; the person using the tool can readily obtain an idea of the force of the blow delivered by merely ascertaining the relative position of the sleeve and the handle, or, in order to provide an indicating means the outside of the extension carried by the handle, or the outside of the sleeve, may be provided with a scale, that is, a number of indentations lying at different points, so that when either end of the sleeve comes opposite any of the marks on the scale the pressure exerted on the spring may be indicated.

Having thus described my invention, what I claim as new and desire to secure by Letters Patent is:—

1. In a spring hammer, the combination of a casing, a movable hammer element in the casing, a spring within the casing for maintaining pressure on the movable element of the hammer, a pin extending transversely of the casing and engaging the end of the spring, the said casing being provided with slots through which the pin extends, and a sleeve surrounding the casing and engaging the pin, movement of the sleeve longitudinally of the casing varying the pressure on the said spring.

2. In a spring hammer, the combination of a casing, a movable hammer element in the casing, a spring within the casing for maintaining pressure on the movable element of the hammer, a pin adjacent one end of the spring, the said casing being provided with slots through which the pin extends, a longitudinally movable sleeve arranged concentrically with the casing, and means whereby the sleeve will be retained in the position to which it has been moved, the said pin engaging the sleeve, movement of the sleeve longitudinally of the casing bringing the said pin to different positions within the said slots, whereby the pressure on the spring is varied, the position of the sleeve relatively to the casing affording an indication of the said pressure.

3. In a spring hammer, the combination of a casing having a handle provided with a tubular extension secured on the casing, the casing and extension being provided with slots extending longitudinally thereof, a movable hammer element in the casing, a spring within the casing for maintaining pressure on the movable element by the hammer, a pin adjacent one end of the spring, the ends of the pin being positioned within the said slots, a sleeve concentric with the extension of the handle and in screw-threaded engagement therewith, the end portions of the said pin being in movable engagement with the said sleeve, whereby turning of the sleeve in order to move it longitudinally of the casing varies the pressure on the spring, the location of the sleeve relatively to the hammer affording an indication of the said degree of pressure.

4. In a spring hammer, the combination of a casing having a handle thereon, a movable hammer element in the casing, a spring within the casing for maintaining pressure on the movable element of the hammer, a sleeve movable longitudinally of the casing toward and away from the handle, means in engagement with the spring and the sleeve whereby the movement of the sleeve varies the pressure on the spring, and means whereby the sleeve will be retained in the position to which it has been moved, the position of the sleeve relatively to the handle affording an indication of the pressure on the spring.

In testimony whereof I have signed my name to this specification in the presence of two subscribing witnesses.

ROLLYN ROBERT SMITH.

Witnesses:
JAMES HOLDEN,
C. W. PIERSON.